(12) United States Patent
Sato

(10) Patent No.: US 8,054,479 B2
(45) Date of Patent: Nov. 8, 2011

(54) IMAGE PROCESSING APPARATUS, IMAGE FORMING APPARATUS AND DOCUMENT READING APPARATUS

(75) Inventor: Yukinari Sato, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 1129 days.

(21) Appl. No.: 11/811,375

(22) Filed: Jun. 8, 2007

(65) Prior Publication Data
US 2008/0007796 A1    Jan. 10, 2008

(30) Foreign Application Priority Data
Jun. 9, 2006  (JP) .................................. 2006-160786

(51) Int. Cl.
G06F 3/12   (2006.01)
G06F 3/00   (2006.01)
G06F 1/26   (2006.01)
G06F 1/32   (2006.01)
G06K 15/00  (2006.01)

(52) U.S. Cl. ......... 358/1.13; 358/1.16; 710/13; 713/320
(58) Field of Classification Search .................. 358/1.13, 358/1.16; 710/13; 713/320
See application file for complete search history.

(56) References Cited

U.S. PATENT DOCUMENTS
2006/0271802 A1* 11/2006 Yanagawa ..................... 713/300

FOREIGN PATENT DOCUMENTS
JP  2004222234  8/2004
JP  2005-244623  9/2005
JP  2007004783   1/2007

* cited by examiner

Primary Examiner — Thomas Lett
(74) Attorney, Agent, or Firm — David G. Conlin; Steven M. Jensen; Edwards Angell Palmer & Dodge LLP

(57) ABSTRACT

The present invention is intended to improve the processing efficiency by shortening a time taken until completion of return processing when image processing is carried out via an external storage device such as a USB memory. There is provided an image processing apparatus including: a communication section capable of data communication with the external storage device; a detection section detecting that data communication with the external storage device is possible; an image forming section; a document reading section; and a control section performing return processing for returning the image processing section and/or the document reading section from a processing-disabled state in which image processing is impossible to a processing-enabled state in which image processing is possible, wherein if the detection section detects that data communication with the external storage device is possible, the control section determines whether the external device is an external storage device or not, and performs the return processing if it is determined that the external device is an external storage device. The time taken until completion of return processing is thus shortened to improve the processing efficiency.

12 Claims, 10 Drawing Sheets

DETERMINATION TABLE

| TIF |
| JPG |
| BMP |
| PDF |

IMAGE PROCESSING APPARATUS, IMAGE FORMING APPARATUS AND DOCUMENT READING APPARATUS

BACKGROUND OF THE INVENTION

1. Field of the Invention

The present invention relates to an image processing apparatus having a communication section carrying out data communication with an external device.

2. Description of the Related Art

As this type of image processing apparatus, Japanese Patent Laid-Open No. 2004-222234 discloses that an image forming section and a document reading section are not energized in a processing-disabled state such as a standby state, and for making a transition from such a processing-disabled state to a processing-enabled ready state, return processing such as warm-up should be carried out by a predetermined operation of selecting and depressing a button provided for each function.

In recent years, there has emerged an image processing apparatus to which an external storage device such as a USB (Universal Serial Bus) memory is connected and which is capable of communication with the external storage device. For this image processing apparatus, when an image stored in the USB memory is to be printed and outputted, the USB memory is connected to the image processing apparatus, a list of images stored in the USB memory is displayed on an operation screen of the image processing apparatus, and the image to be printed is selected, whereby the designated image is printed. When a read image is to be stored in an external storage device such as a USB memory, the USB memory is connected to the image processing apparatus, and an operation panel of the image processing apparatus is operated to designate a recording destination and provide an instruction for reading a document, whereby the document is read and image data is stored in the USB memory.

Japanese Patent Laid-Open No. 2007-4783 (U.S. Publication No. 2006027802) discloses that when a USB device is connected to a USB host interface, switching takes place from a power conservation mode to a normal operation mode.

For performing an operation of printing an image stored in an external storage device in an image processing apparatus capable of communication with the external storage device, a list of images stored in the external storage device is first displayed on an operation screen of the image processing apparatus, and warm-up of an image forming section of the image processing apparatus is started in response to an operation of selecting an image to be printed. For performing an operation of recording an image in the external storage device, warm-up of a document reading section of the image processing apparatus is started in response to the reading of a document on the operation screen of the image processing apparatus and an operation designated by a recording destination. Thus, a predetermined operation is required before warm-up is started, and accordingly, return processing is delayed.

In view of the situation described above, an object of the present invention is to provide an image processing apparatus which can start return processing early to improve the processing efficiency when image processing is performed.

SUMMARY OF THE INVENTION

An image processing apparatus according to the present invention comprises:

an image forming section forming an image based on inputted image data;

a document reading section generating read image data from a document;

a control section performing return processing for returning the image forming section and/or document reading section from a processing-disabled state in which image processing is impossible to a processing-enabled state in which image processing is possible;

a detection section for detecting whether data communication with an external device is possible or not; and a communication section carrying out data communication with the external device, wherein when the detection section detects that data communication with the external device is possible, the control section determines whether the external device is an external storage device or not, and performs the return processing if it is determined that the external device is an external storage device.

Thus, when the detection section detects that data communication with the external device is possible, the control section determines whether the external device is an external storage device (e.g. a USB memory) or not, and starts return processing (warm-up) if it is determined that the external device is an external storage device. Thus, the operator is not left waiting, and therefore the processing efficiency can be improved.

In the image processing apparatus of the present invention, two or more kinds of return processing are further prepared as the return processing including first return processing that is return processing of the image forming section and second return processing that is return processing of the document reading section, and the control section selects one or more kinds of return processing from the two or more kinds of return processing based on the number of designations for each inputted processing mode and performs the selected processing if it is determined that the external device is an external storage device.

Thus, return processing corresponding to a processing mode which is likely used by the operator can be selected from two or more kinds of processing according to the use habit of the operator, and started.

The image processing apparatus of the present invention further comprises an identification section identifying presence/absence of data stored in the external storage device, and based on the result of identification by the identification section, the control section performs first return processing that is return processing of the image forming section if data is stored in the external storage device, and the control section performs second return processing that is return processing of the document reading section if data is not stored.

Thus, return processing corresponding to a processing mode which is likely used by the operator can be selected from two or more kinds of return processing, and started.

The image processing apparatus of the present invention further comprises a determination section determining the data format of image data stored in the external storage device, and based on the result of determination by the determination section, the control section performs first return processing that is return processing of the image forming section if image data in a predetermined specific data format is stored, and the control section performs second return processing that is return processing of the document reading section if image data in the specific data format is not stored.

Thus, appropriate return processing can be selected further accurately from two or more kinds of return processing, and started.

As described above, when the detection section detects that data communication with the external device is possible, the control section determines whether the external device is an external storage device or not, and starts return processing for returning from a processing-disabled state in which image processing is impossible to a processing-enabled state in which image processing is possible without carrying out a predetermined operation if it is determined that the external device is an external storage device. Therefore, the waiting time until returning can be shortened, thus making it possible to improve the processing efficiency.

DETAILED DESCRIPTION OF THE PREFERRED EMBODIMENTS

First Embodiment

Figure 1:
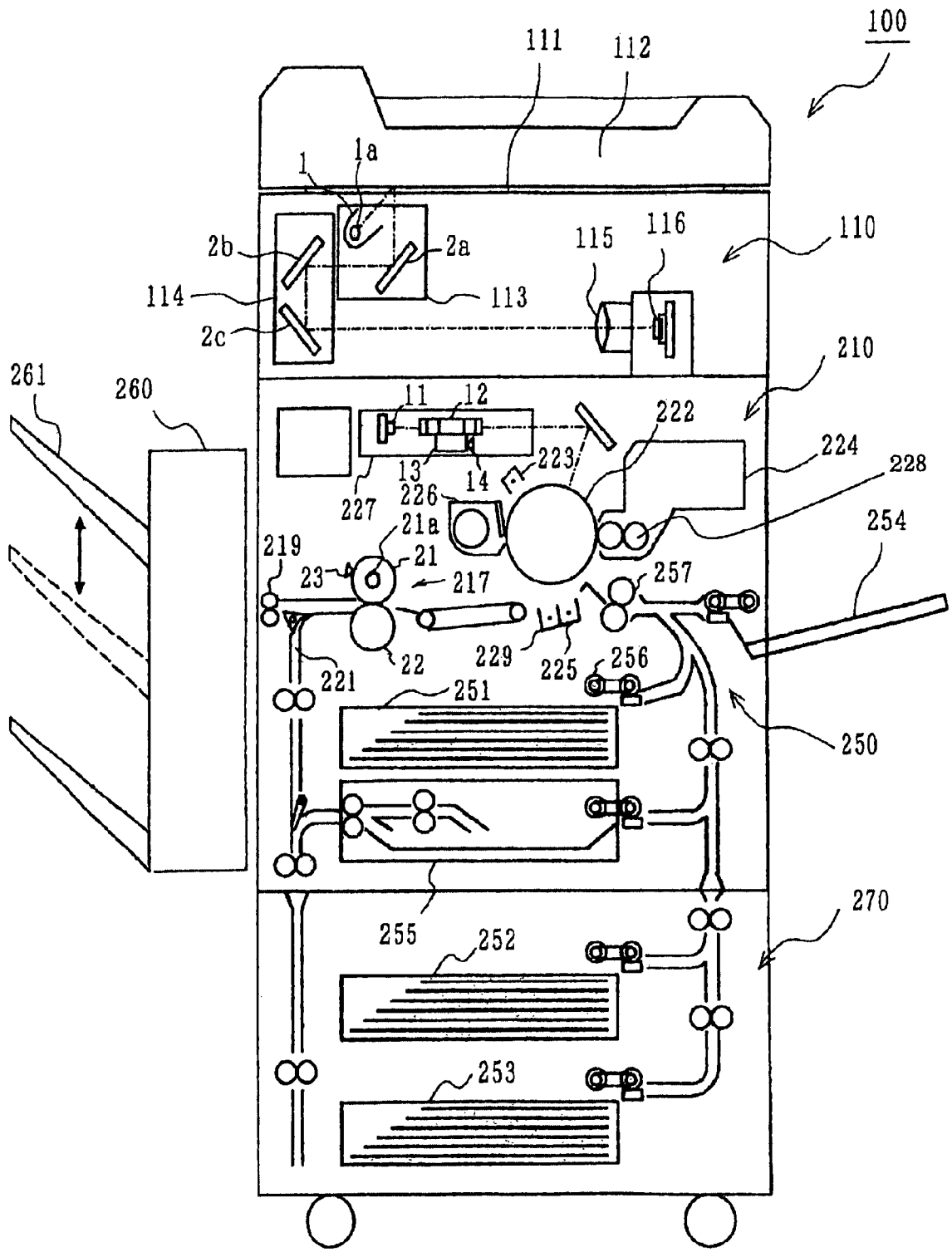
FIG. 1 is a schematic structural diagram of an image processing apparatus showing the first embodiment of the present invention.

FIG. 1 shows a schematic configuration of an image forming apparatus according to the first embodiment of the present invention. An image processing apparatus 100 has an image reading section 110 placed in the upper part, an image forming section 210 in the middle part and a sheet feeding section 250 placed in the lower part. An document tray 111 made of transparent glass placed on the image processing apparatus 100 is provided with an automatic document feeding apparatus 112 automatically feeding documents set on a document set tray onto the document tray 111 one by one. A post-processing unit 260 is mounted on one side surface of the image forming section 210, and a multistage sheet feeding unit 270 also serving as a mounting tray is placed below the sheet feeding section 250.

The image reading section 110 situated below the document tray 111 has a first scan unit 113, a second scan unit 114, and optical lens 115 and a CCD (Charge Coupled Devices) line sensor 116 as a photoelectric conversion element, and relatively scans and reads an image of a document placed on the document tray 111 at a predetermined exposure position by an operation in relation to the automatic document feeding apparatus 112. The first scan unit 113 has a light source lamp unit 1 exposing the surface of the document, and a first mirror 2a reflecting a reflected ray from the document in a predetermined direction. The amount of irradiated light of the light source lamp unit 1 is detected by a light amount sensor 3. The second scan unit 114 has a second mirror 2b and a third mirror 2c guiding reflected light from the document reflected at the first mirror 2a to the CCD line sensor 116 as a photoelectric conversion element. The optical lens 115 causes reflected light from the document to form an image on the light receiving surface of the CCD line sensor 116.

The image forming apparatus 210 is provided with a charging device 223 charging a photosensitive drum 222 to a predetermined electric potential, a laser scan unit (hereinafter referred to as LSU) 227 forming an electrostatic latent image on the photosensitive drum 222 by emitting laser light according to image data transferred from the document reading section 110 or an external apparatus, a developing device 224 feeding a toner through a developing roller 228 to the electrostatic latent image formed on the photosensitive drum 222 to develop the latent image into a toner image, a transferring device 225 transferring to a sheet the toner image formed on the photosensitive drum 222, a cleaning device 226 collecting the toner and the like remaining on the photosensitive drum 222 after the transferring step, and a detachment device 229 detaching a sheet from the photosensitive drum 222 after the transferring step. The laser scan unit 227 has therein a semiconductor laser 11 applying laser light modulated by image data, a polygon mirror 12 polarizing laser light in a main scan direction by rotation together with a group of lenses (not shown) and the like. The polygon mirror 12 is driven by a motor 13. The rotation speed of the motor 13 is detected by a speed sensor 14.

The image forming section 210 is provided with a fixing unit 217 heating and pressing a sheet to which a toner image has been transferred, thereby fixing the toner image on the sheet. The fixing unit 217 has a pair of rollers: a heating roller 21 on the upper side and a pressing roller 22 on the lower side. The heating roller 21 has a heater, and the temperature of the heating roller 21 is detected by a temperature sensor 23. Further, the fixing unit 217 is provided on the discharge side with a switchback pathway 221 reversing a sheet in a longitudinal direction at the time of a double-surface image forming mode for forming images on both surfaces of the sheet.

The sheet having a toner image fixed in the fixing unit 217 is guided to the post-processing apparatus 260 by a sheet discharging roller 219 through the switchback pathway 221 as required, here subjected to post-processing such as staple processing and punching processing, and then discharged onto a tray 261.

The sheet feeding section 250 is constituted by a manual tray 254 mounted on the side of the body, a double-surface unit 255, a sheet feeding tray 251, and sheet feeding trays 252 and 253 provided in the multistage sheet feeding unit 270. These sheet feeding trays 251 to 254 store sheets in a stacked form. The sheet feeding unit 250 has a feeding section such as a roller feeding a sheet fed from sheet feeding trays 251 to 254 to a transfer position between the photosensitive drum 222 and the transferring device 225 in the image forming section 210. The double-surface unit 255 communicates with the switchback pathway 221 reversing a sheet, and temporarily holds a sheet with front and back surfaces reversed at the time of a double-surface image forming mode. The double-surface unit 255 can be replaced with a normal sheet feeding tray.

Figure 2:
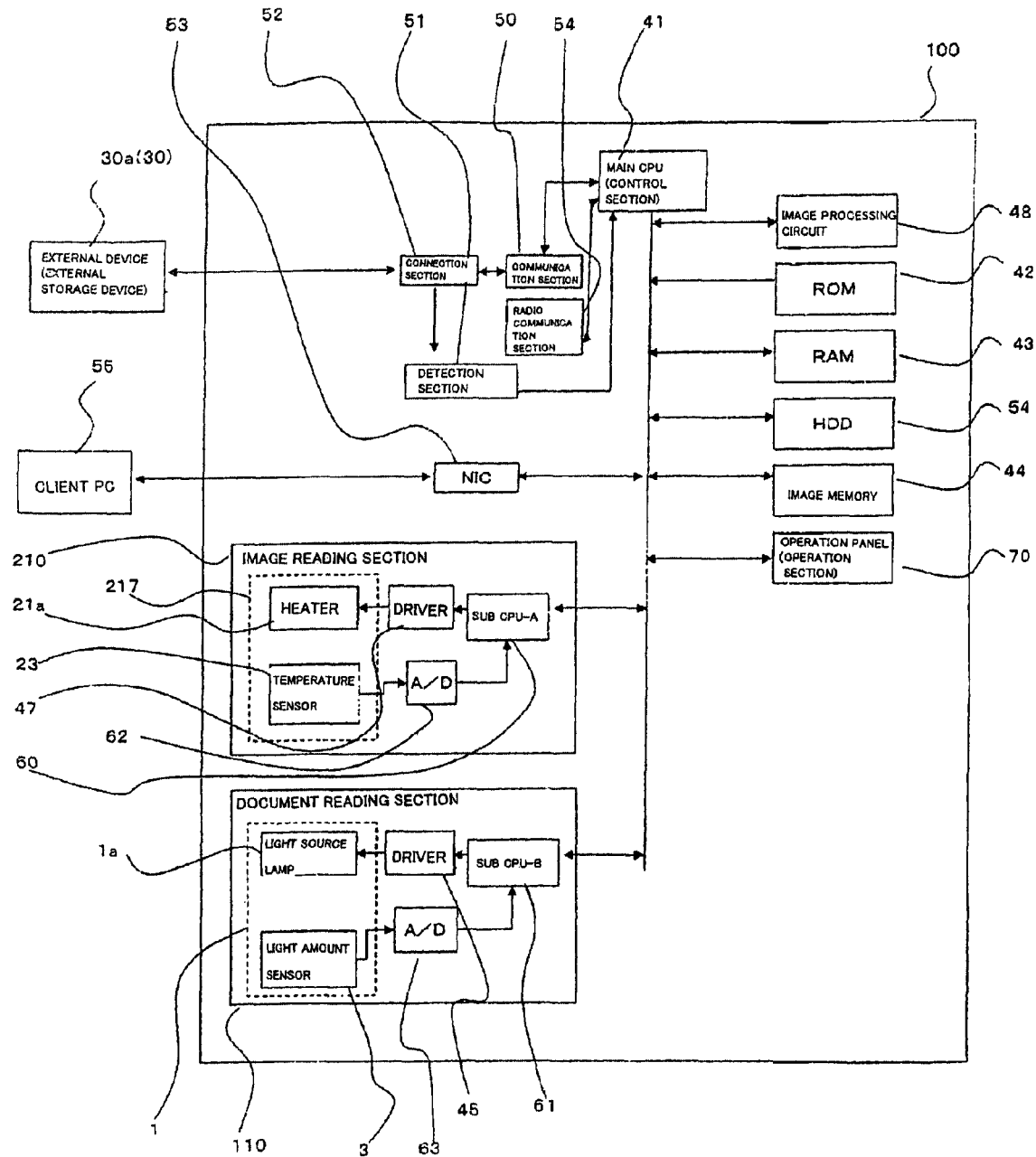
FIG. 2 is a configuration block diagram of the image processing apparatus.

FIG. 2 is a block diagram showing an electric configuration of the image processing apparatus 100. The image processing apparatus 100 has as a control section a main CPU (Central Processing Unit) 41 having a ROM (Read Only Memory) 42 and a RAM (Random Access Memory) 43. To the main CPU 41 are connected an image memory 44, an image processing circuit 48, an HDD (Hard Disk Drive) 54, a communication section 50, a detection section 51, an NIC (Network Interface Card) 53, an operation section (operation panel) 70, a radio communication section 54, a sub CPU-A 60 and a sub CPU-B 61. The main CPU 41 controls input/output devices collectively in accordance with a program previously written in the ROM 42, and temporarily stores data inputted/outputted at this time in a predetermined memory area of the RAM 43. The image memory 44 stores image data outputted from the image processing circuit 48.

The operation section (operation panel) 70 has input keys and a liquid crystal display panel, and can display a state of the apparatus, an available sheet size, a copy scale and the like, and accept an operation of the operator by input keys. The liquid crystal display panel may be a liquid crystal touch panel in which input is possible by touching a liquid crystal screen. The operation section 70 is also an acceptance section accepting the input of a processing mode of the external storage device 30 by the operator.

Processing modes of the external storage device 30 include a document reading mode (SCAN TO USB) in which image data read by the document reading section 110 is stored in the external storage device 30, an image forming mode (USB TO PRINT) in which image data stored in the external storage device 30 is formed into an image by the image forming section 210, a mode (FILE TO USB) in which data stored in the HDD 54 in the image processing apparatus 100 is stored in the external storage device 30, and a mode (USB TO FILE) in which data stored in the external storage device 30 is stored in the HDD 54 in the image processing apparatus 100.

The communication section 50 is an interface for carrying out data communication between an external device (USB-connectable device) 30a and the main CPU 41. A connection section 52 is a connector of USB Standard which establishes connection to the external device 30a. The detection section 51 is a circuit detecting whether data communication is possible with the external storage device 30 or not, and details thereof will be described later.

The external device 30a conforming to USB Standard can be connected to the connection section 52. There are a plurality of types of external devices 30a, and they include, other than a USB memory that is the above-described the external storage device 30, an outside keyboard, and a card reader for reading out a department card given to a department which can use the apparatus, and permitting use of the apparatus. The external device 30a is connected to the image processing apparatus 100, and sends device identification data showing the type of device to the image processing apparatus 100 as a connection destination when electric power is supplied from the image processing apparatus 100. Control appropriate to the type of external device 30a can be performed on the image processing apparatus 100 side based on device identification data.

The NIC 53 is the abbreviated name for Network Interface Card, which is a communication section for carrying out network communication with a client PC 55. The image processing apparatus 100 performs printing based on print data transferred from the client PC 55, or transfers image data obtained by reading a document to the client PC 55 through the NIC 53.

The radio communication section 54 uses a radio communication method such as wireless LAN or infrared communication to carry out data communication with the external device 30b capable of communication, which will be described later.

The forming section 210 is controlled by the sub CPU-A 60, and includes a heater 21a, a temperature sensor 23, a driver 47 and an A/D converter 62. The temperature sensor 23 detects the temperature of the heating roller 21 in the fixing unit 217 and outputs temperature data to the sub CPU-A 60. The main CPU 41 sends a predetermined warm-up command to the sub CPU-A 60 as first return processing. When receiving the predetermined warm-up command from the main CPU 41, the sub CPU-A 60 energizes the heater 21a, and controls the energization of the heater 21a so that the surface temperature of the heating roller 21 heated by the heater 21a is fixed at a predetermined temperature, based on temperature information obtained from the temperature sensor 23. When the surface of the heating roller 21 reaches the predetermined temperature, the sub CPU-A 60 determines that a processing-enabled state (ready state) is attained, and notifies the main CPU 41 of this fact.

The document reading section 110 is controlled by the sub CPU-B 61, and includes a light source lamp 1a, a light amount sensor 3, a driver 45 and an A/D converter 63. The light amount sensor 3 detects the amount of light applied by the light source lamp 1a of the light source lamp unit 1, and inputs light amount data to the sub CPU-B 61. The main CPU 41 sends a predetermined warm-up command to the sub CPU-B 61 as second return processing. When receiving the predetermined warm-up command from the main CPU 41, the sub CPU-B 61 energizes the light source lamp 1a, and controls the energization of the light source lamp 1a so that the light amount of the light source lamp 1a is fixed at predetermined light amount, based on light amount information obtained from the light amount sensor 3. When the light amount of the light amount lamp 1a reaches the predetermined light amount, the sub CPU-B 61 determines that a processing-enabled state (ready state) is attained, and notifies the main CPU 41 of this fact.

The driver 45 drives the light source lamp 1a of the light source lamp unit 1 based on control data outputted from the sub CPU-B 61. The driver 47 drives the heater 21a included in the heating roller 21 of the fixing unit 217 based on control data outputted from the sub CPU-A 60.

To the sub CPU-A 60 and the sub CPU-B 61 are connected a large number of input/output devices operating at the time of document reading processing and image formation processing, such as a motor, a clutch, a solenoid and a sensor in the image forming section and the document reading section, in addition to the devices described above. The sub CPU-A 60 and the sub CPU-B 61 read detection data of the sensor with predetermined timing at the time of document reading processing and image formation processing, and drive the motor or the like according to the detection data.

Figure 3:
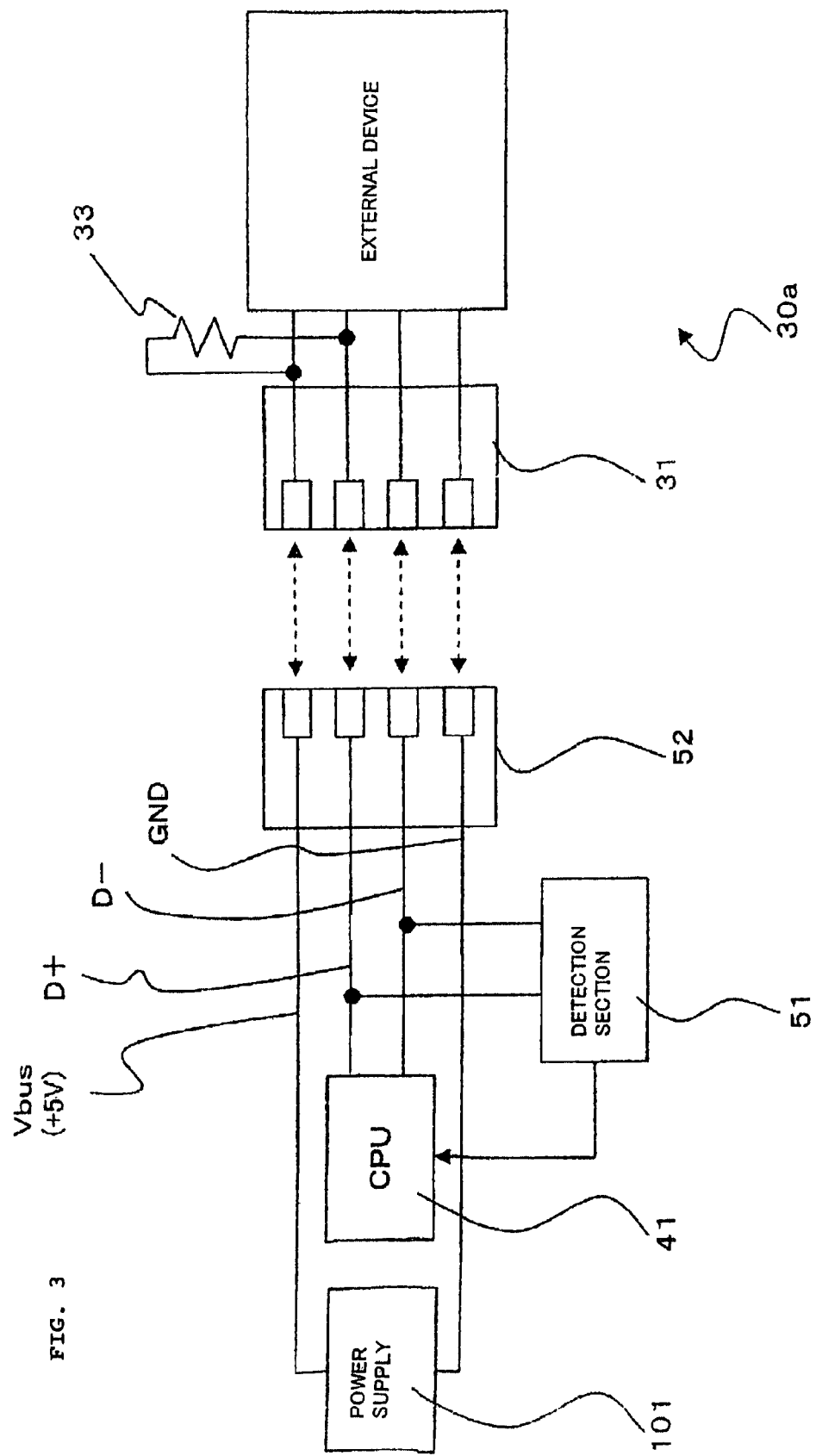
FIG. 3 shows details of a detection section.

The detection section 51 detecting whether data communication with the external device 30a is possible or not will be described below with reference to FIG. 3.

Vbus is a line (+5 V) for supplying electric power to the external device 30a, and a power supply 101 provided in the image processing apparatus 100 supplies electric power to the external device 30a through Vbus. On the external device 30a side is connected a pull-up resistor 33 pulling up a data input/output terminal D+ to the electric potential of Vbus. The pull-up resistor may be connected to a data input/output terminal D−. When the external device 30a is connected to the connection section 52, one of the data input/output terminals D+ and D− is at an electric potential almost equal to that of Vbus. Thus, the detection section 51 detects voltages of data input/output terminals D+ and D−, and if they are at an electric potential almost equal to that of Vbus, the detection section 51 notifies the main CPU 41 of the fact that data communication is possible between the external device 30*a* and the image processing apparatus 100.

(Copy Mode)

Processing in a copy mode in the image processing apparatus 100 having the above configuration will be described below. In this connection, the copy mode includes image reading processing of reading an image of a document and image formation processing of copying the read image on a sheet.

At the time of the copy mode, a document to be copied is placed on the document tray 111 of the document reading section 110, and thereafter the user enters condition input keys (the number of copies, the scale of copy, etc.) on the operation panel, and depresses a start key, whereby a copy operation including image reading processing and image formation processing is started.

In the image processing apparatus 100 starting processing in this manner, first, when the start key is depressed, a main drive motor (not shown) is substantially simultaneously starts, and each drive gear rotates. Thereafter, a sheet feeding roller 256 rotates to feed the sheet. The fed sheet is conveyed through the inside of a conveyance pathway to a resist roller 257. Here, the sheet is temporarily stopped for synchronization with the edge of an image on the photosensitive drum 222, and the edge of the sheet is uniformly pressed against the resist roller 257 to correct the edge position of the sheet.

In the document reading section 110, image information during the reading of the document is read in the following way. The light source lamp 1*a* of the light source lamp unit 1 lights, and the scan unit 113 moves in a direction of arrow A to start exposure scan. Reflected light at the document image surface, of light applied from the light source lamp unit 1, is received by the CCD 116 after passing through mirrors 2*a*-2*c* and the optical lens 115, and read as image information. The read image information is converted into image data as digital data in the image processing circuit 48. The image data is subjected to image processing under set conditions, temporarily stored in the image memory 44, and then supplied to the LSU 227 as image data.

The surface of the photosensitive drum 222 rotating at a predetermined speed is given an electric charge, and uniformly charged to a predetermined charged electric potential. The LSU 227 drives the semiconductor laser 11 based on image data supplied from the control section 41, and applies laser light modulated by the image data to the surface of the photosensitive drum 222 through the polygon mirror 12 rotating at a predetermined speed. By application of laser light by the LSU 227, an electrostatic latent image based on image data is formed on the surface of the photosensitive drum 222. A toner is fed from the developing unit 224 to the surface of the photosensitive drum 222 having an electrostatic latent image formed thereon, so that the electrostatic latent image is developed into a toner image.

The sheet is conveyed to between the photosensitive drum 222 and the transferring device 25 by the resist roller 256 starting rotation in synchronization with the rotation of the photosensitive drum 222, and receives the transfer of the toner image held on the surface of the photosensitive drum 222 by the transferring device 225. A toner remaining on the surface of the photosensitive drum 222 is removed and collected together with sheet flakes by the cleaner 226.

The sheet, which has received the transfer of the toner image, is conveyed to the fixing unit 217, and heated and pressed while passing between the heating roller 21 and the pressing roller 22. The toner image transferred on the sheet is melted by heating and pressing by a pair of rollers 21 and 22, and fixed solidly on the sheet surface. The sheet on which the toner image is fixed is discharged to the post-processing apparatus 260 through the sheet discharging roller 219.

(Print Mode)

The image processing apparatus 100 transfers to the LSU 227 of the image forming section 210 print data inputted through the NIC 53 from the client PC 55 and image data stored in the external storage device 30 connected through the communication section 50, and performs printing.

(Scan Mode)

The image processing apparatus 100 transfers image data with image information of a document read in the document reading section 110 and stored in the image memory 44 to the client PC 55 through the NIC 53 or to the external storage device 30 connected through the communication section 50.

(Filing Mode)

The image processing apparatus 100 stores in the HDD 54 image data acquired by the document reading section 110 and image data transferred from the external storage device 30 connected through the communication section 50. The stored image data may be printed by the image forming section 210, or transferred to the client PC 55 through the NIC 53.

The configuration of the image processing apparatus 100 having the document reading section 110 and the image forming section 210 has been described above, but in this embodiment, the image processing apparatus 100 may be an apparatus (document reading apparatus) which has a document reading section but does not have an image forming section, or conversely may be an apparatus (image forming apparatus) which has an image forming section but does not have a document reading section. For the electric configuration, the document reading apparatus has a configuration with the image forming section 210 removed from the configuration of the block diagram shown in FIG. 2, and the image forming apparatus has a configuration with the document reading section 110 removed from the configuration of the block diagram shown in FIG. 2.

Figure 4:
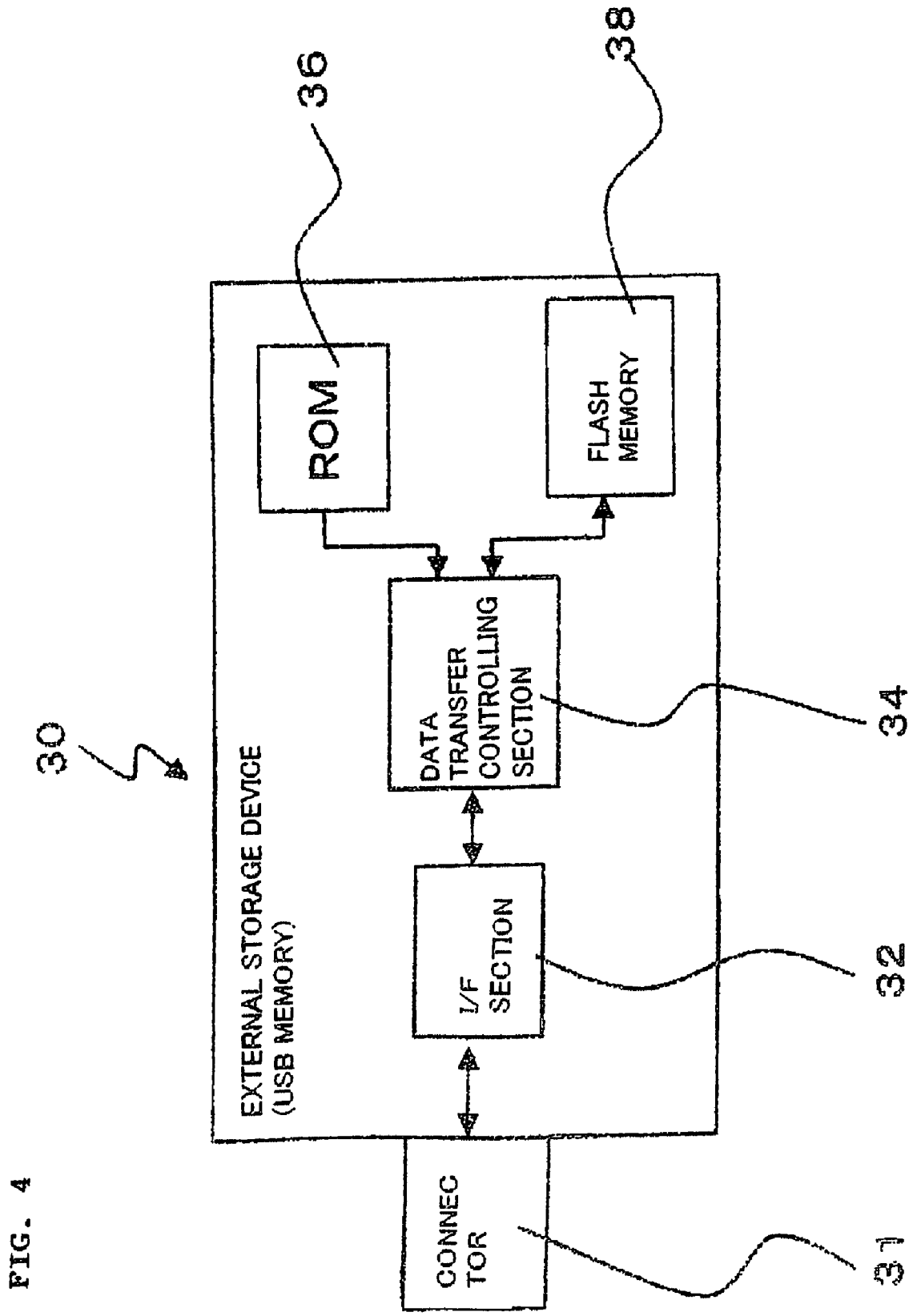
FIG. 4 is a configuration block diagram of an external storage device.

FIG. 4 is a block diagram showing an example of a configuration of the external storage device 30. Examples of the external storage device include a USB memory. The external storage device 30 has a connector 31 connected to the connection section 52 of the image processing apparatus 100, an I/F section 32 controlling communication with the image processing apparatus 100, a flash memory 38 in which image data and the like are stored, and a data transfer controlling section 34 such as a CPU controlling the reading of data from the flash memory 38 to the I/F section 32 and the writing of data from the I/F section 32 onto the flash memory 38 based on a control program stored in the ROM 36. The data transfer controlling section 34 carries out authentication processing between itself and the control section 41 of the image processing apparatus 100, and permits data transfer with the image processing apparatus 100 through the communication section if the authentication is successful.

Figure 5:
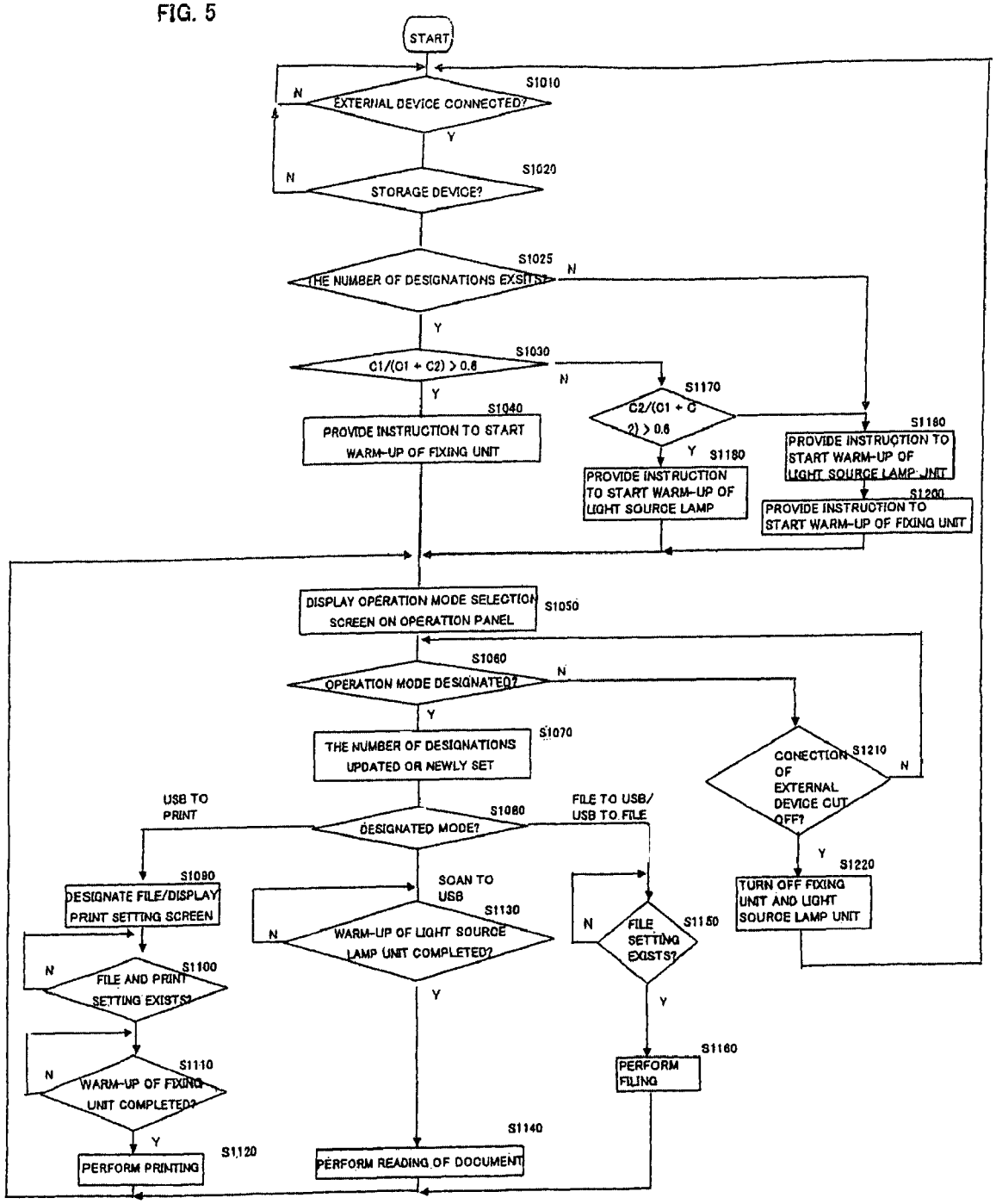
FIG. 5 is a control flowchart of image processing.

FIG. 5 is a flowchart showing main parts of the first processing procedure in the control section of the image processing apparatus 100. Processing in the flowchart is performed by the control section (main CPU 41) in a processing-disabled state in which it is impossible for the image forming section 210 and/or the document reading section 110 to carry out image processing. The processing-disabled state corresponds to a state in which for power conservation, the image forming section and the document reading section are not energized (standby state) or a state in which although the image forming section and the document reading section are energized, a state of enabling image processing is not attained (preheating state). Either the standby state or preheating state is a state in which the fixing heater temperature of the image forming section does not reach a predetermined temperature or a state in which the light source lamp of the document reading section does not reach a predetermined light amount.

When an electric power switch (not shown) is turned on, the image processing apparatus 100 carries out return processing (warm-up) so as to make a transition from a state in which the apparatus is stopped to a processing-enabled state (ready state). When a predetermined condition is satisfied after making transition to the processing-enabled state, a transition is made from the processing-enabled state to the processing-disabled state (standby state or preheating state). The predetermined condition refers to a predetermined operation by the operator or a predetermined time (several minutes to several tens of minutes; variable according to setting) having elapsed after execution of the last image processing.

The processing-enabled state in the image forming section 210 refers to a state in which the heating roller 21 of the fixing unit 227 melting and fixing a toner image by heating and pressing the sheet after a transferring step has its temperature increased to a predetermined temperature allowing the toner image to be melted so that image formation processing is possible. By return processing, the temperature of the heating roller is thus increased to a predetermined temperature.

The processing-enabled state in the document reading section refers to a state in which the light source lamp 1$a$ of the light source lamp unit 1 applying light for reading image information from a document placed on the document tray 111 applies a predetermined amount of light for obtaining image data having an appropriate density so that image reading processing is possible. By return processing, the light amount of the light source lamp is thus increased to a predetermined light amount.

The flowchart of FIG. 5 will be described in detail below. When detection section 51 detects the connection to the external device 30$a$ to detect a state of enabling communication with the external device 30$a$ (S1010) in the processing-disabled state, communication with the external device 30$a$ is performed, device identification data sent from the external device 30$a$ is received, and whether the connected external device is the external storage device 30 (USB memory) capable of storing data is determined based on the device identification data (S1020). If the external device 30$a$ is the external storage device 30, whether the number of designations is stored in the external storage device 30, i.e. presence/absence of data of the number of designations, is determined (S1025).

The number of designations is the cumulative number of times where the processing mode is designated by the operator. The number of designations is stored in a recording medium. As the recording medium, the external storage device 30 may be used. Alternatively, the HDD 54 in the image processing apparatus 100 may be used as the recording medium.

If the number of designations is stored (Y of S1025), the following processing is carried out at S1030. First, a reference is made to the number of designations stored in the external storage device 30. The number of designations is, specifically, C1 representing the number of designations for USB TO PRINT which was used in the past and C2 representing the number of designations for SCAN TO USB. C1 and C2 are read out. If the number of designations C1 is equal to or greater than "60% of the sum of C1+C2" which is a predetermined number (C1/(C1+C2)>0.6) (Y of S1030), the frequency of use of USB TO PRINT is high, and therefore a command for warming up the fixing unit 217 is sent to the sub CPU-A 60 (execution of first return processing) (S1040) to warm up the fixing unit 217.

When receiving the command, the sub CPU-A 60 lights the heater 21$a$ to increase the temperature of the heating roller to a predetermined temperature. If C1 is not equal to or greater than the predetermined number (N of S1030), the step S1170 is performed. If the number of designations C2 is equal to or greater than "60% of the sum of C1+C2" which is a predetermined number (C2/(C1+C2)>0.6) (Y of S1170), the frequency of use of SCAN TO USB is high, and therefore a command for warming up the light source lamp unit 1 is sent to the sub CPU-B 61 (execution of second return processing) (S1180) to warm up the light source lamp unit 1. When receiving the command, the sub CPU-B 61 lights the light source lamp 1$a$ to increase the light amount of the light source lamp 1$a$ to a predetermined light amount.

If C2/(C1+C2)>0.6 does not hold (N of S1170), or the number of designations has not been stored in the external storage device (N of S1025), a command for warming up the light source lamp unit 1 is sent to the sub CPU-B 61 (S1190) and a command for warming up the fixing unit 217 is sent to the sub CPU-A 60 (S 1200) to warm up both the fixing unit 217 and light source lamp unit 1.

Figure 6:
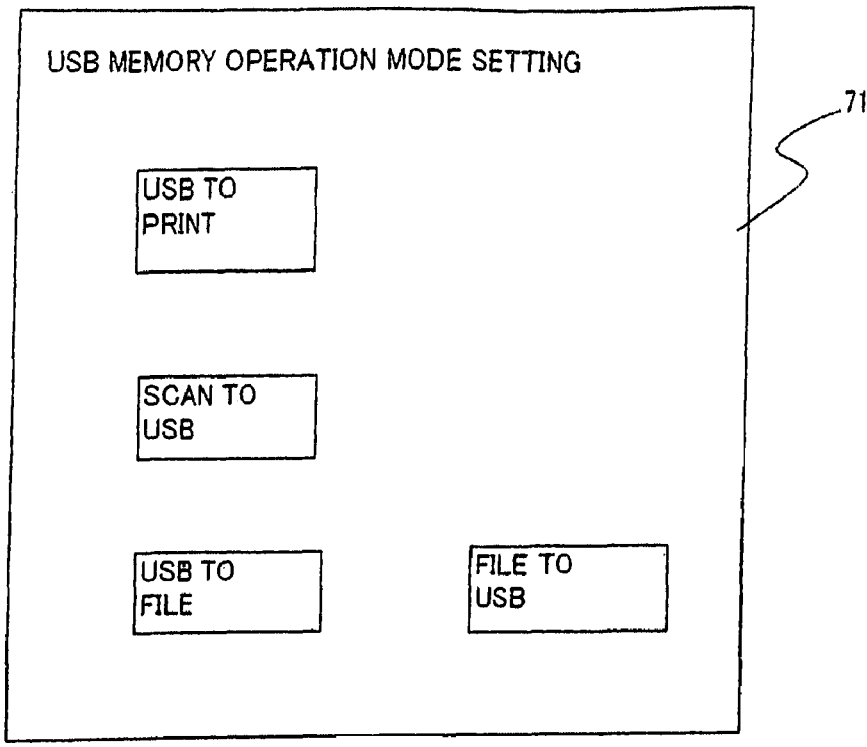
FIG. 6 shows an example of an operation mode setting screen of an operation panel.

Next, a selection screen for selecting a processing mode is displayed on the operation panel 70 (S1050). In this step, display is provided so that the user can select any one of USB TO PRINT, SCAN TO USB, FILE TO USB (data stored in the HDD in the image processing apparatus is stored in the external storage device 30) and USB TO FILE (data stored in the external storage device 30 is stored in the HDD in the image processing apparatus), which are processing modes used when the external storage device 30 is connected. An example of screen display on the operation panel 70 is shown in FIG. 6. Selectable processing modes are displayed on the liquid crystal touch panel 71 provided on the operation panel 70, and the operator can designate a processing mode by touching the display area of a predetermined processing mode.

When the processing mode is inputted (Y of S1060), the aforementioned values of C1 and C2 are updated if the number of designations has already been stored in the external storage device. If the number of designations has not been stored in the external storage device, C1 and C2 are newly stored in the external storage device as the number of designations, and subsequently used as the number of designations (S1070).

Specifically, when C1 and C2 are updated, C1 as the number of designations for USB TO PRINT is incremented (+1) if USB TO PRINT is designated. If SCAN TO USB is designated, C2 as the number of designations for SCAN TO USB is incremented (+1). When C1 and C2 are newly stored, the number of designations is stored in the storage medium as C1=1, C2=0 or C1=0, C2=1 according to the designated processing mode.

Thus, by storing the number of designations in the external storage device 30, appropriate return processing can be selected from two or more kinds of return processing according to the frequency of use of the processing mode for each operator, and performed, if each operator possesses the external storage device 30 as a personal device.

Figure 7:
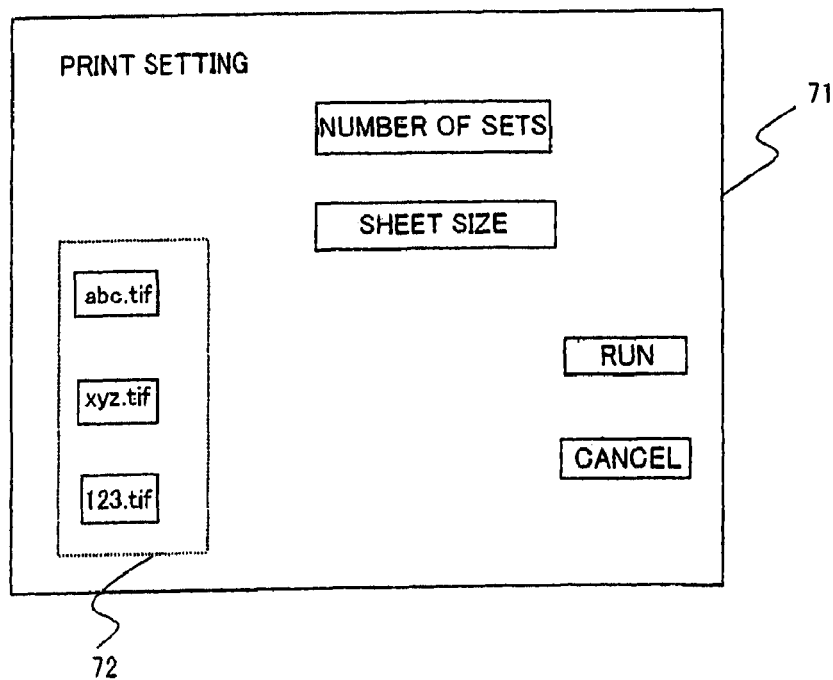
FIG. 7 shows an example of a print setting screen of the operation panel.

Next, the processing mode designated by the operator is determined (S1080). For USB TO PRINT, a list 72 of files stored in the external storage device 30 is displayed (1090) as shown in FIG. 7. When print settings such as a file which the operator wants to print, the number of sets and the sheet size are designated and an instruction for print execution is provided (Y of S1100), printing of the designated file is performed (S1120) after warm-up of the fixing unit 217 is completed (S1110).

For SCAN TO USB, after warm-up of the light source lamp unit 1 is completed (S1130), the reading of a document is performed, and the read image data is stored in the external storage device 30 (S1140).

For FILE TO USB or USB TO FILE, a file designation by the operator is accepted (S1150), the designated file in the external storage device 30 is stored in the HDD in the image processing apparatus. Alternatively, the designated file in the HDD in the image processing apparatus is stored in the external storage device 30 (S1160). When removal of the external storage device 30 from the main body is detected (S1210) in a state of waiting until the processing mode is designated and inputted at S1060 (N of S1060), warm-up of the fixing unit 217 and the light source lamp unit 1 is interrupted (S1220).

Specifically, a command is transferred to the sub CPU-A 60 and the sub CPU-B 61 to cut off energization of the heater 21a and the light source lamp 1a or make a transition to a preheating state. A transition is made to a standby state of waiting for connection of the external device 30a (S1010).

Second Embodiment

Figure 8:
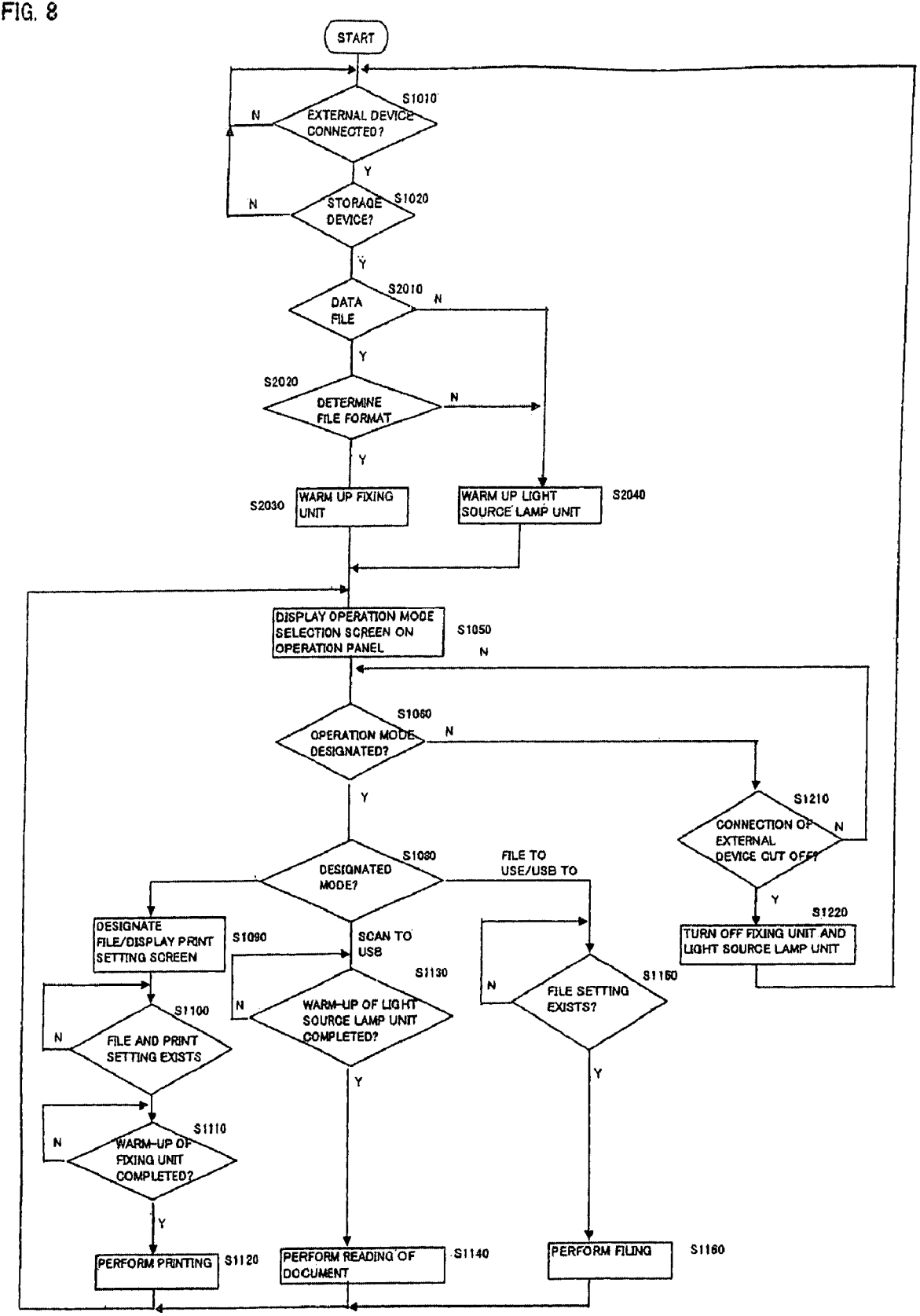
FIG. 8 shows a flowchart showing the second embodiment of the present invention.

FIG. 8 is a flowchart showing main parts of the second processing procedure in the control section of the image processing apparatus 100.

Processing in the flowchart is performed by the control section (main CPU 41) in a state in which it is impossible for the image forming section 210 and/or the document reading section 110 to carry out image processing.

The identification section identifying presence/absence of image data in the external storage device 30 will be described below. The identification section consists of the main CPU 41, and identifies existence/nonexistence of data in the external storage device 30 based on a file management table stored in the flash memory 38. The data transfer controlling section 34 provided in the external storage device 30 may be used as the identification section, wherein the data transfer controlling section 34 performs control to identify existence/nonexistence of data and send the result of identification to the main CPU 41.

The file management table stores the names, sizes and storage start addresses of all data files stored at least in the flash memory 38, and is used for managing data files and accessing data files. When a data file is accessed, the main CPU 41 sends to the data transfer controlling section 34 a command for designating a desired data file based on the recorded contents of the file management table. When receiving the command, the data transfer controlling section 34 reads out the data file and sends the data file to the main CPU 41. In this way, the data file can be accessed.

The determination section determining the data format of image data in the external storage device 30 will be described below. The determination section consists of the main CPU 41, and determines whether or not image data has a predefined specific data format referring to the data format of image data in the external storage device 30, based on the contents of the file management table. The data transfer controlling section 34 provided in the external storage device 30 may be used as the identification section, wherein the data transfer controlling section 34 determines the data format and sends the result of determination to the main CPU 41.

The flowchart shown in FIG. 8 will be described in detail below. Explanations of steps S1010 and S1020 are omitted, since they are as described in the first embodiment. Existence/nonexistence of a data file stored in the external storage device is identified referring to the file management table of the external storage device (S2010). Specifically, the main CPU 41 sends to the data transfer controlling section 34 in the external storage device 30 a command for inquiring about the contents of the file management table stored in the flash memory 38. When receiving the command, the data transfer controlling section 34 transfers the contents of the file management table to the main CPU 41. The main CPU 41 identifies existence/nonexistence of a data file referring to the file management table.

Figures 9, 10:
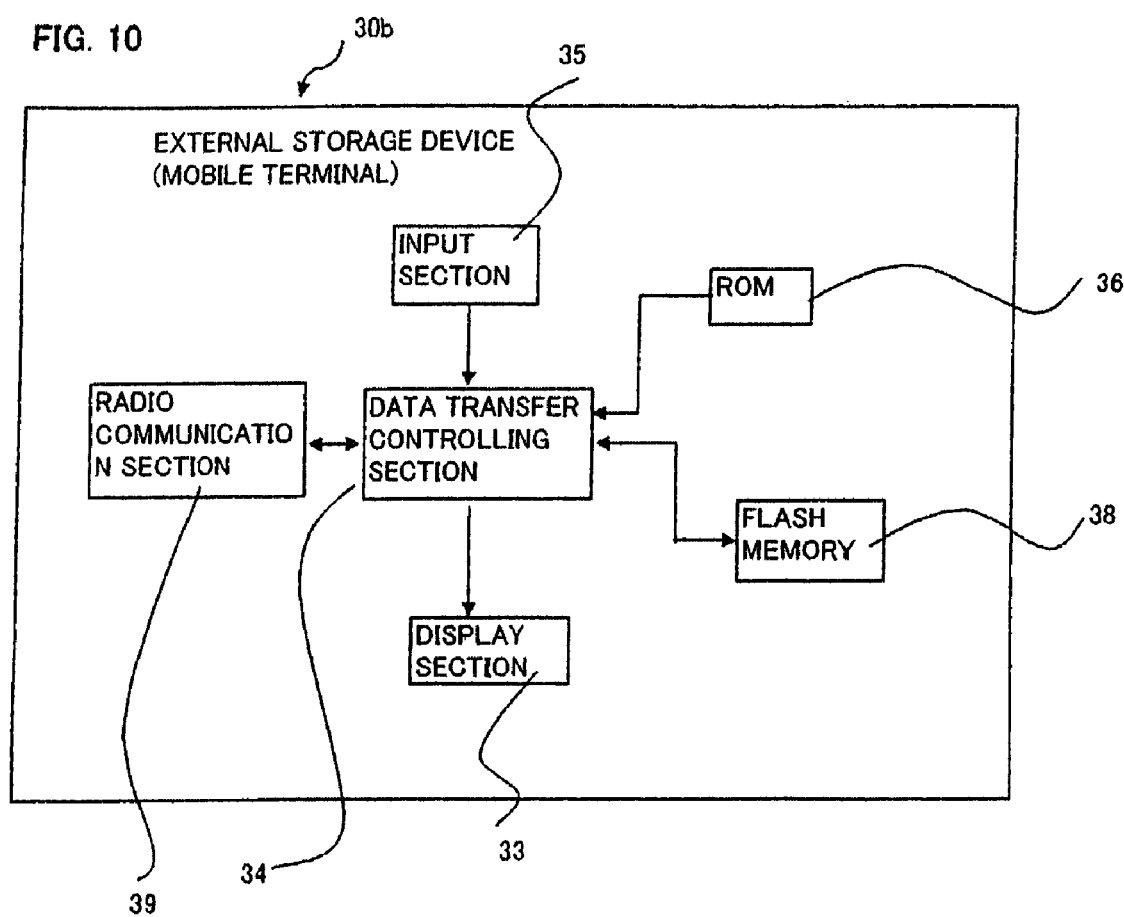
FIG. 9 shows an determination table.
FIG. 10 is a configuration block diagram showing the third embodiment of the present invention.

If a data file is stored (Y of S2010), whether or not data is image data of a specific data format enabling USB TO PRINT is determined based on the extension of the data file, referring to the file management table (S2020). For explanation of determination processing in detail, the name of the file stored in the file management table includes an extension as format data for determining the file format. If the extension matches data described in the determination table of FIG. 9, it is determined that the file includes image data of a bitmap format and has a file format enabling USB TO PRINT. If the extension indicates TIFF, JPEG, BMP, PDF as an example, imaged data of the bitmap is included, and USB TO PRINT is possible. Which image format enables USB TO PRINT should be set according to the specifications of the image processing apparatus.

If it is determined that the data is image data adaptable to USB TO PRINT (Y of S2020), a command for warming up the fixing unit 217 is sent to the sub CPU-A 60 (S2030) to warm up the fixing unit 217. If it is determined that data is not stored in the external storage device, or although data is stored, the data is not image data adaptable to USB TO PRINT (N of S2020), a command for warming up the light source lamp unit 1 is sent to the sub CPU-B 61 (S2040) to warm up the light source lamp unit 1. Explanations of steps subsequent to step S1050 are omitted, since they are as described in the first embodiment.

The second embodiment has been described above, but the following embodiments are also possible as other embodiments. Namely, if it is determined that there is image data adaptable to USB TO PRINT (Y of S2020), the fixing unit 217 and the light source lamp unit 1 are both warmed up. If there is not image data adaptable to USB TO PRINT, or although data is stored, the data has a different file format and it is determined that the data is not image data adaptable to USB TO PRINT (N of S2010 and N of S2020), only the light source lamp unit 1 is warmed up. The reason for doing so is that SCAN TO USB may be used even when no image data adaptable to USB TO PRINT is in the external storage device 30. On the other hand, if there is not image data adaptable to USB TO PRINT, it is not necessary to warm up the fixing unit 217 because there is no possibility of performing USB TO PRINT.

Third Embodiment

Devices other than the USB memory can be used as the external storage device 30, and another embodiment will be described below. An example will be described below in which a mobile terminal such as a mobile telephone or a PDA as the external storage device 30 is used as the external storage device 30b capable of radio communication (see FIG. 10).

The radio communication section 39 is provided so as to be capable of radio communication with a radio communication apparatus such as the radio communication section 54 provided in the image processing apparatus 100 and a wireless LAN connected to the client PC by a radio communication method such as a wireless LAN or infrared communication. The input section 35 accepts operation input by the operator by a key switch or the like. The display section 33 displays information by a liquid crystal panel or the like. Explanations of other members denoted by symbols same as those in FIG. 4 are omitted.

In the configuration described above, radio communication is used to perform SCAN TO USB and USB TO PRINT using the image processing apparatus 100. An electromagnetic wave detecting circuit (not shown) is provided in the radio communication section 54 of the image processing apparatus 100. The electromagnetic wave detecting circuit detects an electromagnetic wave (data transmission electromagnetic wave for radio communication section 54) emitted by the external storage device 30b capable of radio communication to determine whether data communication is possible or impossible between the external storage device 30b and the image processing apparatus 100. For radio communication, the electromagnetic wave detecting circuit corresponds to the detection section.

Further, when the mobile terminal 30b is thus used, the input section 35 may be used as a section inputting the aforementioned processing mode. The processing mode inputted from the input section 35 is transmitted toward the image processing apparatus 100 by radio communication. In this case, the radio communication section 54 corresponds to the acceptance section accepting the input of the processing mode.

Fourth Embodiment

Figure 11:
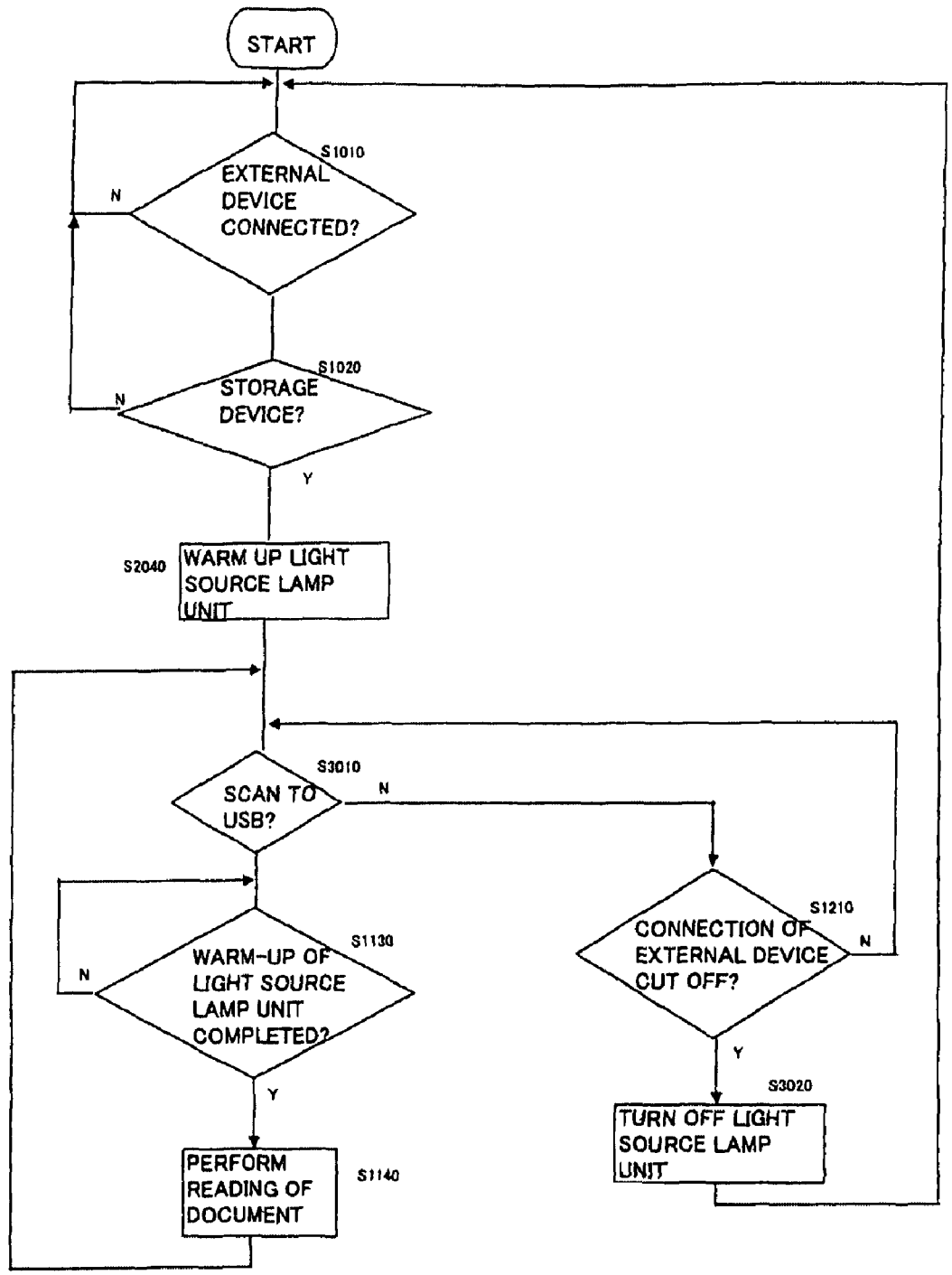
FIG. 11 is a flowchart showing the fourth embodiment of the present invention.

FIG. 11 is a flowchart showing an example of processing in the document reading apparatus. The following explanations will be based on this flowchart. The explanations of steps denoted by symbols common to first and second embodiments are omitted, since they are as described above.

If connection of the external device 30a is detected and it is determined that the external device 30a is the external storage device 30 (Y of S1020), a command for warning up the light source lamp unit 1 is sent to the sub CPU-B 61 (S2040) to warm up the light source lamp unit 1. Otherwise (N of S1020), warm-up is not performed. If the operator provides an instruction to perform SCAN TO USB (Y of S3010), SCAN TO USB is performed after warm-up is completed. When removal of the external storage device 30 from the main body is detected (S1210), warm-up of the light source lamp unit 1 is interrupted (S3020). Specifically, a command is transferred to the sub CPU-B 61 to interrupt energization of the light source lamp 1a or make a transition to a preheating state. A transition is made to a standby state of waiting for connection of the external device 30a (S1010).

Fifth Embodiment

Figure 12:
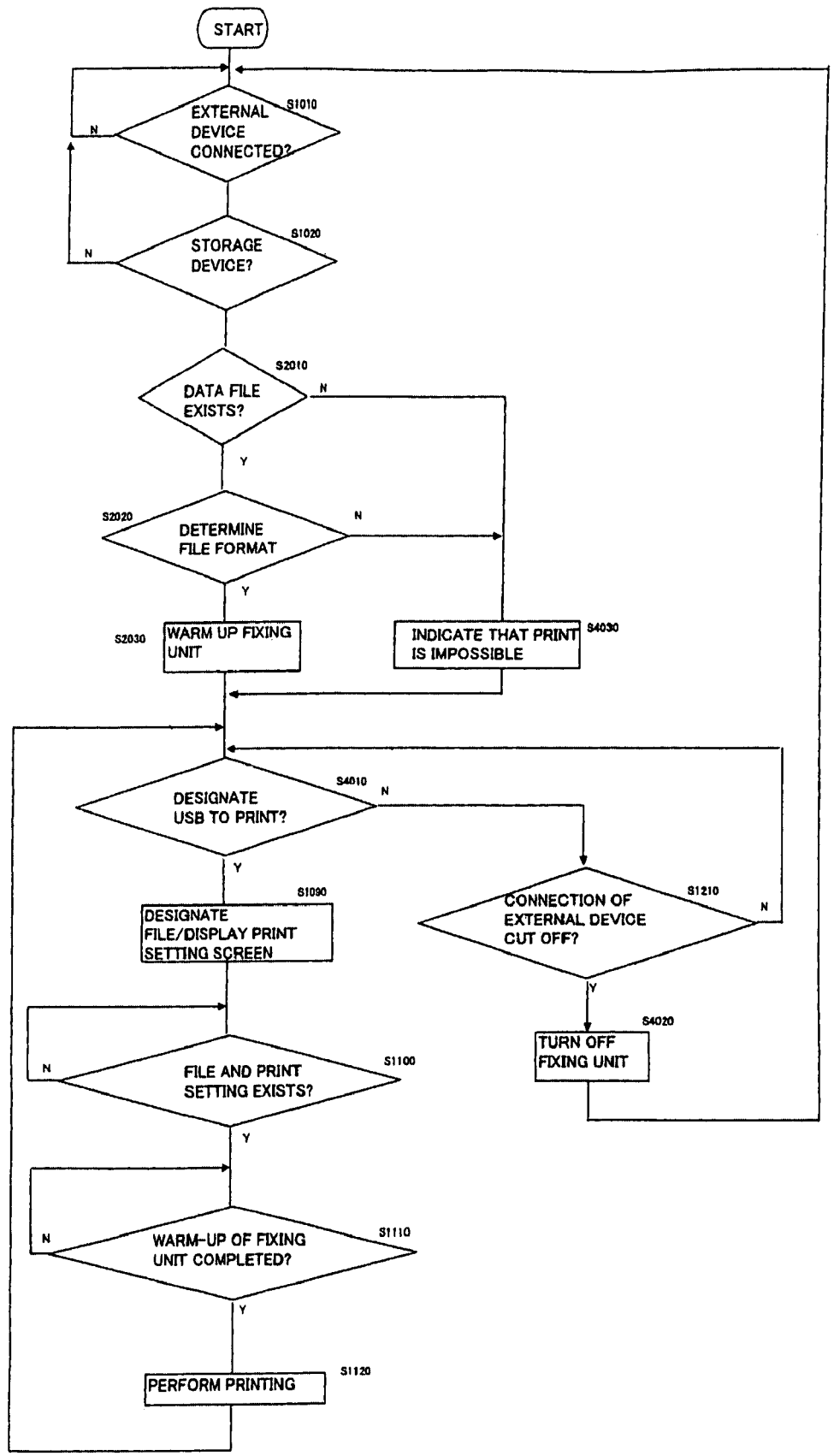
FIG. 12 is a flowchart showing the fifth embodiment of the present invention.

FIG. 12 is a flowchart showing an example of processing in the image processing apparatus. The following explanations will be based on this flowchart. The explanations of steps denoted by symbols common to first and second embodiments are omitted, since they are as described above.

If it is determined that there is image data adaptable to USB TO PRINT (Y of S2020), a command for warming up the fixing unit 217 is sent to the sub CPU-A 60 (S2030) to warm up the fixing unit 217. Otherwise (N of S2020), warm-up is not performed, and display is provided on the display section 70 indicating that USB TO PRINT is impossible (S4030).

If the operator provides an instruction to perform USB TO PRINT (Y of S4010), USB TO PRINT is performed after warm-up is completed. If removal of the external storage device 30 from the main body is detected (S1210), warm-up of the fixing unit 217 is interrupted (S4020). Specifically, a command is transferred to the sub CPU-A 60 to interrupt energization of the heater 21a or make a transition to a preheating state. A transition is made to a standby state of waiting for connection of the external device 30a (S1010).

Embodiments of the present invention are as described above, but further, the external storage device is not limited to a USB memory, but may be a storage device capable of USB connection, for example an HDD and an MO drive. Further, the standard for connection may be a standard other than USB, for example IEEE 1394 (Institute of Electrical and Electronic Engineers 1394) as a digital interface linking devices to one another. Furthermore, the image processing apparatus may be a color multiple function apparatus.

Return processing of the fixing unit and the light source lamp unit has been shown as examples of return processing of the present invention. The return processing is not limited thereto, but may be the following processing.

1) The motor 13 rotating the polygon mirror 12 is at rest during the time period over which the image reading section is in a processing-disabled state. As return processing, rotation of the motor 13 is started, and the rotation speed is increased to a predetermined speed allowing reading processing.

2) The developing roller 228 provided in the developing device 22, which is at rest during the time period over which the image forming section 210 is in a processing-disabled state, is rotated before an image is formed (preliminary rotation).

3) Similarly, the photosensitive drum 222, which is at rest during the time period over which the image forming section 210 is in a processing-disabled state, is rotated before an image is formed.

What is claimed is:

1. An image processing apparatus comprising:
an image forming section forming an image based on inputted image data;
a document reading section generating read image data from a document;
a control section performing return processing for returning the image forming section and/or document reading section from a processing-disabled state in which image processing is impossible to a processing-enabled state in which image processing is possible;
a detection section for detecting whether data communication with an external device is possible or not; and
a communication section carrying out data communication with the external device,
wherein when the detection section detects that data communication with the external device is possible, the control section determines whether the external device is an external storage device or not, and performs the return processing if it is determined that the external device is an external storage device.

2. The image processing apparatus according to claim 1, wherein two or more kinds of return processing are further prepared as the return processing including first return processing that is return processing of the image forming section and second return processing that is return processing of the document reading section, and the control section selects one or more kinds of return processing from the two or more kinds of return processing based on the number of designations for each inputted processing mode and performs the selected processing if it is determined that the external device is an external storage device.

3. The image processing apparatus according to claim 2, wherein the processing mode includes an image formation mode in which image data stored in the external storage device is formed into an image by the image forming section, and if the number of designations for the image formation mode is greater than a predetermined number, the control section performs the first return processing.

4. The image processing apparatus according to claim 2, wherein the processing mode includes a document reading mode in which image data read by the document reading section is stored in the external storage device, and if the number of designations for the document reading mode is greater than a predetermined number, the control section performs the second return processing.

5. The image processing apparatus according to claim 2, wherein the control section stores the number of designations in a storage medium.

6. The image processing apparatus according to claim 5, wherein the external storage device is used as the storage medium.

7. The image processing apparatus according to claim 5, wherein if it is determined the external device is an external storage device, the control section determines whether or not the number of designations is stored in the storage medium, prepares the number of designations based on the designated processing mode and stores the number if the number of designations is not stored yet, and updates the number of designations based on the designated processing mode if the number of designations is already stored.

8. The image processing apparatus according to claim 1, wherein the image processing apparatus comprises an identification section identifying presence/absence of data stored in the external storage device, and based on the result of identification by the identification section, the control section performs first return processing that is return processing of the image forming section if data is stored in the external storage device, and the control section performs second return processing that is return processing of the document reading section if data is not stored in the external storage device.

9. The image processing apparatus according to claim 1, wherein the image processing apparatus comprises a determination section determining the data format of image data stored in the external storage device, and based on the result of determination by the determination section, the control section performs first return processing that is return processing of the image forming section if image data in a predetermined specific data format is stored in the external storage device, and the control section performs second return processing that is return processing of the document reading section if image data in the specific data format is not stored in the external storage device.

10. The image processing apparatus according to claim 9, wherein the specific data format is a data format including an image of a bitmap format.

11. An document reading apparatus comprising:
a document reading section generating read image data from a document;
a control section performing return processing for returning the document reading section from a processing-disabled state in which image processing is impossible to a processing-enabled state in which image processing is possible;
a detection section detecting whether data communication with an external device is possible or not; and
a communication section carrying out data communication with the external device,
wherein if the detection section detects that data communication with the external device is possible, the control section determines whether the external device is an external storage device or not, and performs the return processing if it is determined that the external device is an external storage device.

12. An image forming apparatus comprising:
an image forming section forming an image based on inputted image data;
a control section performing return processing for returning the image forming section from a processing-disabled state in which image processing is impossible to a processing-enabled state in which image processing is possible;
a detection section detecting whether data communication with an external device is possible or not; and
a communication section carrying out data communication with the external device,
wherein if the detection section detects that data communication with the external device is possible, the control section determines whether the external device is an external storage device or not, and performs the return processing if it is determined that the external device is an external storage device.

* * * * *